(12) United States Patent
Sakurai et al.

(10) Patent No.: US 8,894,289 B2
(45) Date of Patent: Nov. 25, 2014

(54) SEALING DEVICE FOR AXLE BEARING

(75) Inventors: Tasuku Sakurai, Wako (JP); Morinobu Kawamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/115,045

(22) PCT Filed: May 25, 2012

(86) PCT No.: PCT/JP2012/063474
§ 371 (c)(1),
(2), (4) Date: Oct. 31, 2013

(87) PCT Pub. No.: WO2012/172954
PCT Pub. Date: Dec. 20, 2012

(65) Prior Publication Data
US 2014/0093200 A1    Apr. 3, 2014

(30) Foreign Application Priority Data

Jun. 13, 2011 (JP) ................. 2011-131480

(51) Int. Cl.
*F16C 33/76* (2006.01)
*F16C 33/66* (2006.01)
*F16C 33/78* (2006.01)
*F16J 15/32* (2006.01)

(52) U.S. Cl.
CPC ......... *F16C 33/6681* (2013.01); *F16C 33/7863* (2013.01); *F16C 33/7883* (2013.01); *F16J 15/3264* (2013.01); *F16C 33/76* (2013.01); *F16C 2233/00* (2013.01)
USPC ............................ 384/484; 277/551; 384/486

(58) Field of Classification Search
USPC .................... 384/484–486; 277/51, 571, 572
See application file for complete search history.

(56) References Cited

U.S. PATENT DOCUMENTS

| | | | |
|---|---|---|---|
| 5,997,005 A * | 12/1999 | Gold et al. | 277/571 |
| 8,387,993 B2 * | 3/2013 | Horton et al. | 277/551 |
| 8,702,312 B2 * | 4/2014 | Yamada et al. | 384/477 |
| 2008/0240638 A1 * | 10/2008 | Otsuka | 384/492 |

FOREIGN PATENT DOCUMENTS

| | | |
|---|---|---|
| JP | 61-058520 B2 | 12/1986 |
| JP | 2002-227856 A | 8/2002 |
| JP | 2003-262231 A | 9/2003 |

OTHER PUBLICATIONS

International Search Report of PCT/JP2012/063474, mailing date of Aug. 28, 2012.

* cited by examiner

*Primary Examiner* — Thomas R. Hannon
(74) *Attorney, Agent, or Firm* — Westerman, Hattori, Daniels & Adrian, LLP

(57) ABSTRACT

A sealing device for an axle bearing includes a lubricant maintained on sliding contact surfaces, thereby suppressing elevation of torque due to the depletion of grease. A lubricant-adsorbing layer comprises a thickener and a binder. The lubricant comprises a base oil and a thickener. The thickener and the thickener are mutually attracted. A lubricant layer of a prescribed thickness is formed on the lubricant-adsorbing layer. This lubricant layer adheres closely to the lubricant-adsorbing layer making it difficult to separate the lubricant layer from the lubricant-adsorbing layer.

6 Claims, 14 Drawing Sheets

SEALING DEVICE FOR AXLE BEARING

TECHNICAL FIELD

The present invention relates to a sealing device disposed between inner and outer races of a lubricant-filled bearing to prevent leakage of a lubricant from the bearing.

BACKGROUND ART

When a sealing device having a lip portion and a slinger in sliding contact with the lip portion is used in a bearing, friction loss unavoidably occurs between the lip portion and the slinger. The slinger preferably has a small coefficient of friction on a sliding contact surface thereof so as to effectively use a power. In terms of useful life of the sealing device, additionally, it is necessary to reduce abrasion of the lip portion. To meet these demands, a variety of structures have been proposed (for example, see patent literature 1 below). FIG. 20 hereof shows in cross-section a sealing device 100 for a bearing disclosed in patent literature 1.

As shown in FIG. 20, the sealing device 100 includes a seal member 102 reinforced by a core metal 101, and a slinger 105 in sliding contact with lip portions 103, 104 of the seal member 102. The slinger 105 is L-shaped in cross-section and has a sliding contact surface 106 to which a hard chromium electroplating layer 107 is applied.

The hard chromium electroplating layer 107 can reduce abrasion of the slinger 105, thereby extending useful life of the sealing device. However, it is not possible to improve the coefficient of friction. Patent literature 2 below teaches a structure designed to provide a small coefficient of friction.

Patent literature 2 teaches that the hard chromium electroplating layer 107 is replaced with DLC (diamond-like carbon). Since diamond is hard and carbon is better self-lubricating, DLC is hard and better self-lubricating.

Carbon is self-lubricating enough to prevent seizure even when the sliding contact surface lacks a lubricant such as grease. When the sliding contact surface lacks a lubricant serving as a heat-conducting agent, a large torque is generated due to the lack of grease. At this time, the sliding contact surface becomes high in temperature due to accumulation of heat thereon. The high temperature causes thermal degradation of the seal member. This results in shortened useful life of the seal member. What has been desired is a sealing device for a bearing configured to retain a lubricant on a sliding contact surface of the device for preventing a large torque from being generated due to lack of grease.

PRIOR ART LITERATURE

Patent Literature

Patent Literature 1: JP-A-2003-262231
Patent Literature 2: JP-A-2002-227856

SUMMARY OF INVENTION

Technical Problem

It is an object of the present invention is to provide a sealing device for a bearing configured to retain a lubricant on a sliding contact surface of the device for preventing a large torque from being generated due to lack of grease.

Solution to Problem

According to one aspect of the present invention, as defined in claim 1, there is provided a sealing device for a bearing having an inner race, an outer race, rolling elements fitting between the inner race and the outer race, and a lubricant filling a space around the rolling elements, the device being disposed between the inner race and the outer race to prevent leakage of the lubricant, the device comprising: a seal member reinforced by a core metal; and an L-shaped cross-sectional slinger having a sliding contact surface formed in sliding contact with a lip portion of the seal member, wherein at least one of the sliding contact surface of the slinger and the lip portion has a lubricant adsorbing layer formed thereon for adsorbing the lubricant, the lubricant adsorbing layer being made of a thickener for grease and a binder.

Preferably, as defined in claim 2, the thickener is lithium stearate or urea compound, and the binder is one of alkyd and epoxy.

Preferably, as defined in claim 3, the thickener is melamine-based condensate and the binder is phenol.

Preferably, as defined in claim 4, the lubricant adsorbing layer is formed by a spraying or dipping process.

Advantageous Effects of Invention

As defined in claim 1, the lubricant adsorbing layer made of the thickener and the binder is formed on at least one of the sliding contact surface of the slinger and the lip portion. Wherever the lubricant to be applied to the bearing is grease, a thickener is contained in this grease lubricant. The thickener contained in the lubricant adsorbing layer attracts the thickener in the lubricant, such that the lubricant is adsorbed onto the sliding contact surface of the slinger and/or the lip portion on which the lubricant adsorbing layer is formed.

Since the lubricant adsorbed is retained between the sliding contact surface of the slinger and the lip portion, there is no concern about lack of a lubricant therebetween. The lubricant prevents the temperature increase and thermal degradation, thereby preventing thermal deformation of the lip portion. That is, in the sealing device of the present invention, the lubricant is held on the sliding contact surface, preventing torque from increasing due to lack of grease.

As defined in claim 2, the thickener is lithium stearate or urea compound. Lithium stearate or urea compound is easily available and thus the lubricant adsorbing layer is easily applied to the sliding contact surface and/or the lip portion.

As defined in claim 3, the thickener is melamine-based condensate. When the thickener is melamine-based condensate, the bearing provides a smaller torque and the lubricant adsorbing layer has a better adsorptive property when the thickener is lithium stearate or urea compound. The smaller torque leads to reduction in energy loss. The better adsorptive property eliminates concern about lack of a lubricant.

As defined in claim 4, the lubricant adsorbing layer is formed by the spraying or dipping process. That is, the spraying makes it possible to form the lubricant adsorbing layer on desired locations of the sliding contact surface of the slinger and/or the lip portion. The dipping makes it possible to form the lubricant adsorbing layer on the sliding contact surface of the slinger and/or the lip portion in a short time, thereby improving productivity.

DESCRIPTION OF EMBODIMENT

A certain preferred embodiment of the present invention is described below with reference to the accompanying drawings.

Embodiment

Figure 1:
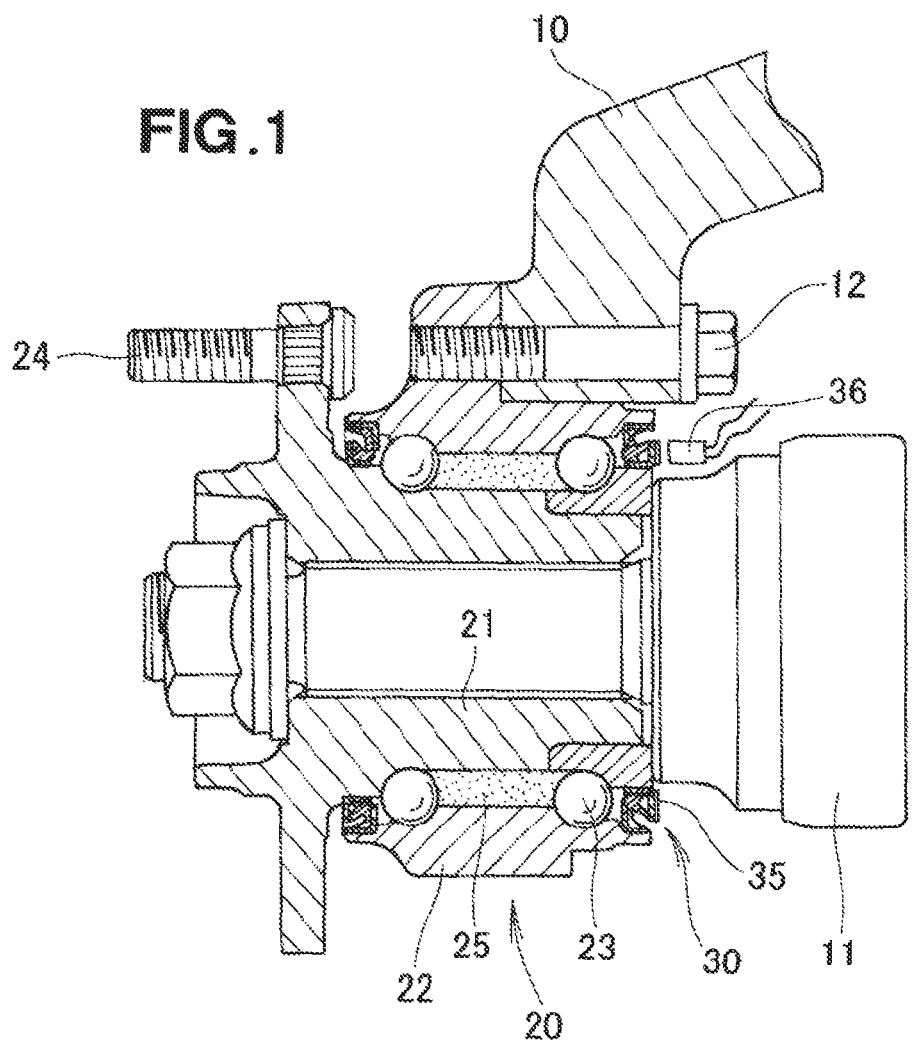
FIG. 1 is a cross-sectional view of a bearing with a sealing device in an embodiment of the present invention.

As shown in FIG. 1, a driveshaft 11 is rotatably supported by a vehicle body frame 10 through a bearing 20. The bearing 20 includes an inner race 21 attached to the driveshaft 11, an outer race 22 secured to the vehicle body frame 10 by a bolt 12, and a plurality of rolling elements 23 disposed between the inner race 21 and the outer race 22.

A vehicle wheel is secured to the inner race 21 by a bolt 24. The inner race 21 is rotated by the driveshaft 11 to rotate the vehicle wheel through the bolt 24. A lubricant 25 such as grease fills a space around the rolling elements 23. A sealing device 30 is disposed between the inner race 21 and the outer race 22 to prevent leakage of the lubricant 25.

Figure 2:
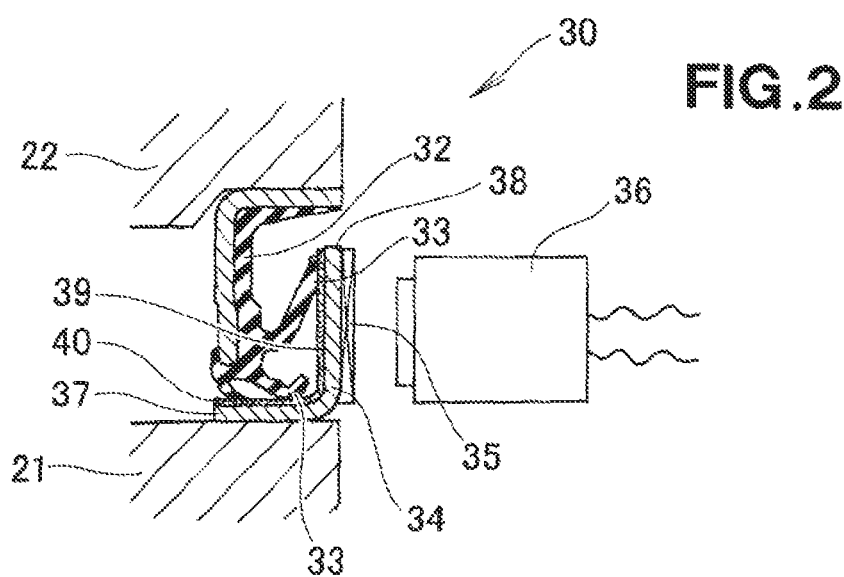
FIG. 2 is a cross-sectional view of the sealing device shown in FIG. 1.

As shown in FIG. 2, the sealing device 30 includes a seal member 32 reinforced by a metal core of L-shaped cross-section, and a slinger 34 disposed in sliding contact with lip portions 33 of the seal member 32. The slinger 34 fits around the inner race 21 and the metal core 31 fits into the outer race 22.

In the embodiment shown in FIG. 2, the slinger 34 has an outer surface to which is provide on an encoder ring 35 which is a magnetic ring having alternate N and S poles. The encoder ring 35 is monitored by a magnetic sensor 36 disposed outside the encoder ring for measuring a rotational angle of the encoder ring 35 to detect an amount of rotation of the vehicle wheel so as to measure a vehicle speed.

The slinger 34 is an L-shaped cross-sectional member including a tubular portion 37 and a disc portion 38 extending radially outwardly from one end of the tubular portion 37. The slinger 34 is formed by bending a stainless steel or carbon steel material with a press machine. The tubular portion 37 and the disc portion 38 have an outer circumferential surface and an inner surface, respectively, which surfaces define a sliding contact surface 39 to which is applied a lubricant adsorbing layer 40.

Although a method for preparing the lubricant adsorbing layer 40 is discussed later, the lubricant adsorbing layer 40 includes a thickener for grease (hereinafter referred to as "thickener") and a binder. A detailed discussion as to the thickener is made later.

Figure 3:
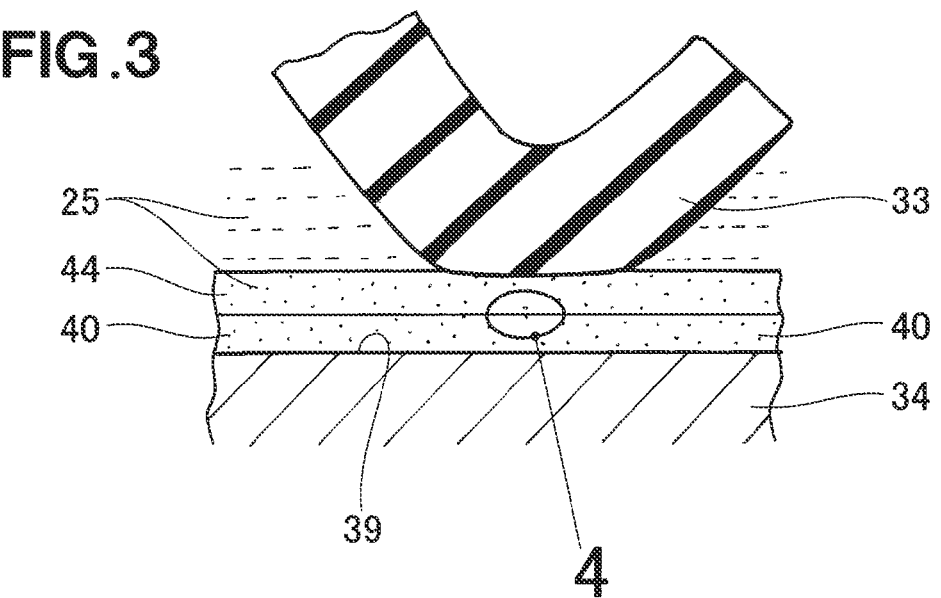
FIG. 3 is an enlarged cross-sectional view of a lip portion, a slinger and a lubricant adsorbing layer interposed therebetween.

As shown in FIG. 3, the lubricant adsorbing layer 40 is formed on the sliding contact surface 39 of the slinger 34. The lip portions 33 of the seal member 32 exist around the lubricant 25 to seal the lubricant 25 up. A lubricating oil is a fluid liquid. The lubricating oil is made semi-fluid by mixing with a thickener. That is, the lubricant 25 is a semi-solid material made of a base oil and a thickener.

Figure 4:
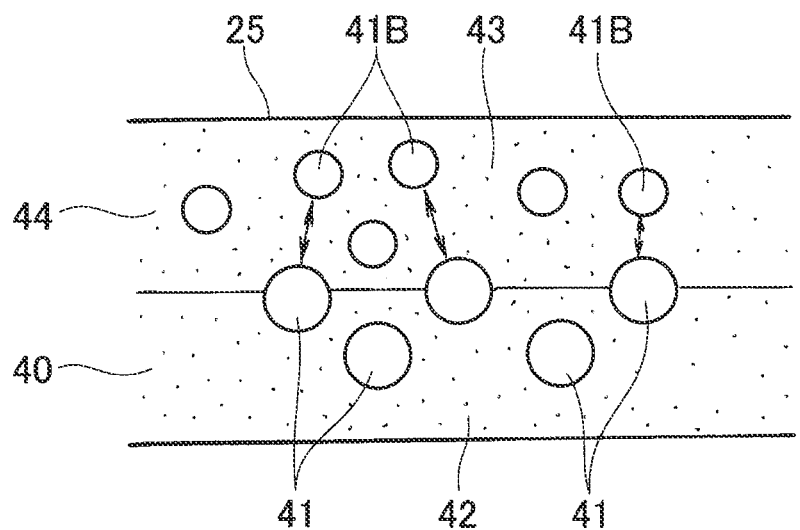
FIG. 4 is an enlarged view of a region 4 of FIG. 3.

As shown in FIG. 4, the lubricant adsorbing layer 40 is made of first thickeners 41 and a binder 42. The lubricant 25 is made of a base oil 43 and a thickener 41B, as discussed above. Results of experiments discussed later assume that the first thickeners 41 and the second thickener 41B strongly interact.

As a result of strong interaction of the first thickener 41 and the second thickener 41B, a lubricant layer 44 having predetermined thickness is formed on the lubricant adsorbing 40, as shown in FIG. 3. The lubricant layer 44 is adsorbed on the lubricant adsorbing 40 such that the lubricant layer 44 cannot be easily released from the lubricant adsorbing layer 40, which provides advantageous results special to the present invention.

As shown in FIG. 3, the lip portion 33 has a distal end (a lowermost shear layer) in the lubricant layer 44 such that the distal end is lubricated at all times to thereby provide small coefficient of friction. As a result, generation of frictional heat is reduced and the generated heat is transmitted to and absorbed by the lubricant layer 44. Thus, the lip portion 33 does not become high in temperature, which prevents thermal degradation of the lip portion 33.

An exemplary slinger 34 having the lubricant adsorbing layer 40 providing the function as discussed above is shown in FIG. 5.

Figure 5:
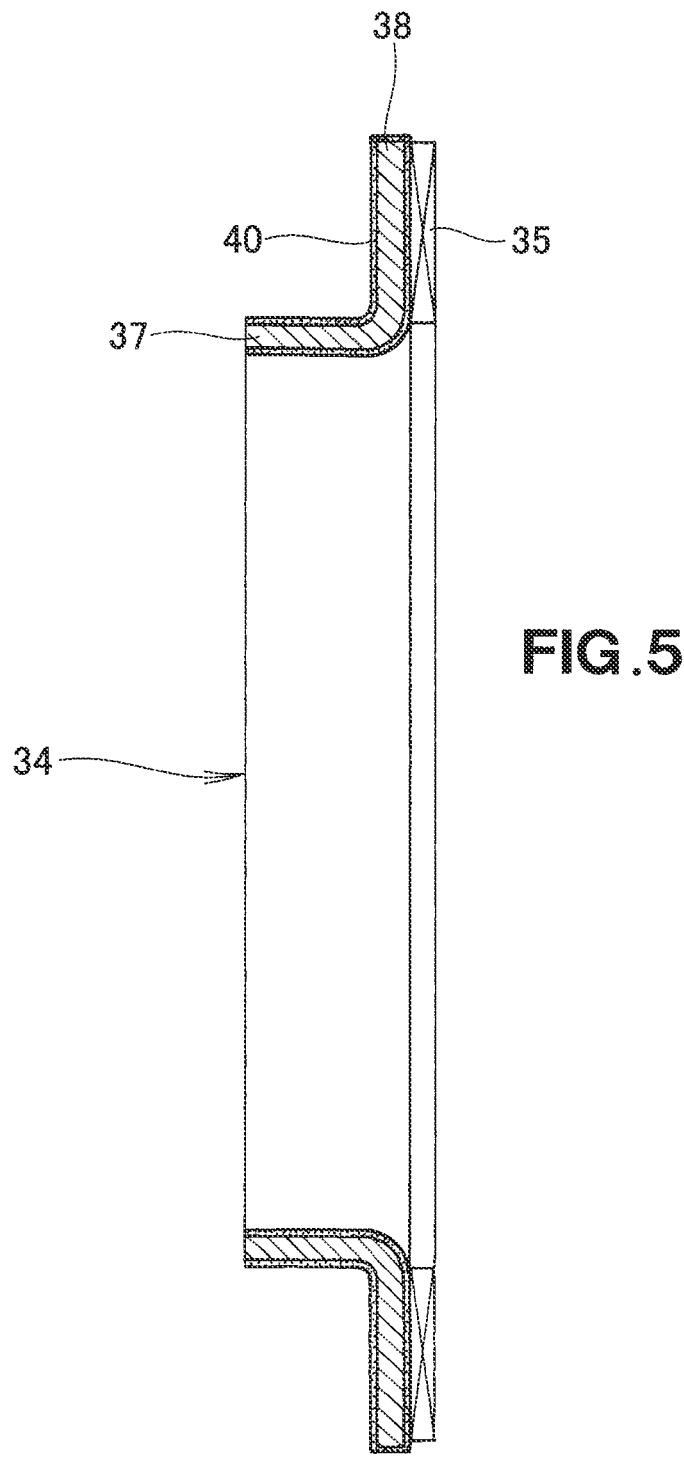
FIG. 5 is a cross-sectional view of a slinger shown in FIG. 2.
Figure 6:
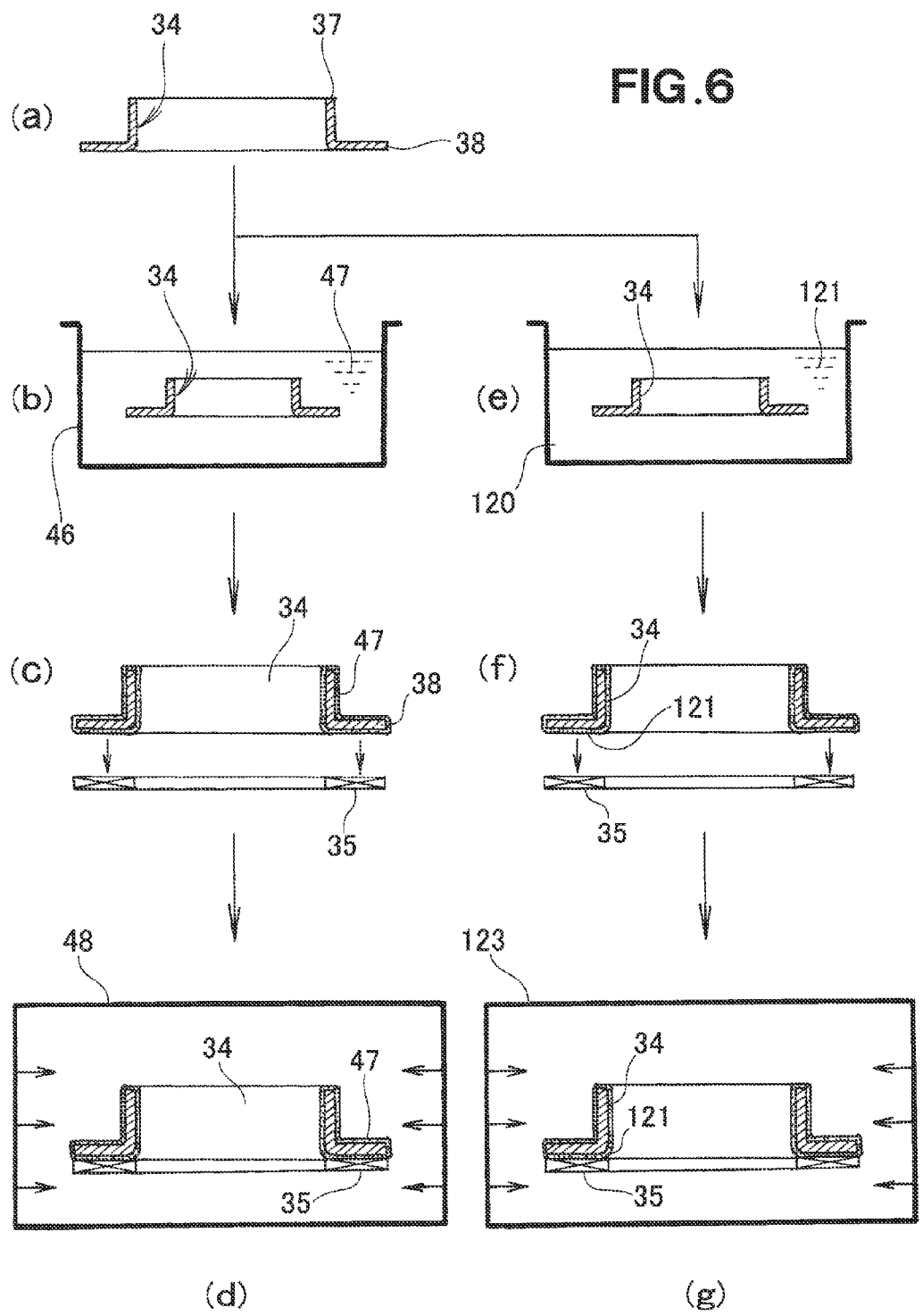
FIG. 6 is a view showing a process of manufacturing the slinger shown in FIG. 5.

The slinger 34 shown in FIG. 5 has the substantially entire surface to which the lubricant adsorbing layer 40 is applied. Through one part of the lubricant adsorbing layer 40, the encoder ring 35 is attached to the disc portion 38. The slinger 34 of this type shown in FIG. 5 is manufactured in the manner discussed below with reference to FIG. 6.

First, as shown in FIG. 6(a), the slinger 34 is prepared. A vessel 46 is filled with a mixture 47 of a thickener and a binder, as shown in FIG. 6(b). The slinger 34 is dipped into the mixture 47. When the slinger 34 is pulled out of the vessel 46, a film of the mixture 47 having a predetermined thickness clings to the slinger 34, as shown in FIG. 6(c). The encoder ring 35 can stick to the disc portion 38 under adhering action of the binder.

A firing process is performed within a firing furnace 48 shown in FIG. 6(d), thereby providing the lubricant adsorbing layer 40 (FIG. 4) with the thickener being immobilized by the binder. Simultaneously, the encoder ring 35 firmly adheres to the slinger 34.

Next, a well-known process for sticking the encoder ring 35 to the slinger 34 without using a thickener discussed in the embodiment of the present invention is described with reference to FIG. 6(e) to FIG. 6(g) for the purpose of comparison with the process shown in FIG. 6(a) to FIG. 6(d).

As shown in FIG. 6(e), a vessel 120 is filled with an adhesive 121. The slinger 34 is dipped into the adhesive 121 such that the adhesive 121 is applied to the entire periphery of the slinger 34. The encoder ring 35 adheres to the slinger 34 through the adhesive 121, as shown in FIG. 6(f). The adhesive 121 is dried in a drying oven 123, as shown in FIG. 6(g).

The process in the embodiment of the present invention shown in FIG. 6(b) to FIG. 6(d) differs from the well-known process shown in FIG. 6(e) to FIG. 6(g) as follows.

The slinger formed by the well-known process provides a high torque because the adhesive component having a poor slidable property exists on the slidable surface of the slinger. In contrast, the slinger formed by the process in the embodiment of the present invention provides a low torque because the mixture of the binder and the thickener adsorbs a lubricant such that the slidable surface of the slinger and the lip portion of the seal member hold the lubricant therebetween.

The present inventors perform the following experiments to confirm a performance of the lubricant adsorbing layer 40 discussed above.

EXPERIMENTS

The experiments according to the present invention are discussed below. It is noted that the present invention is not limited to the results of the experiments.

Test Pieces Preparation

Figure 7:
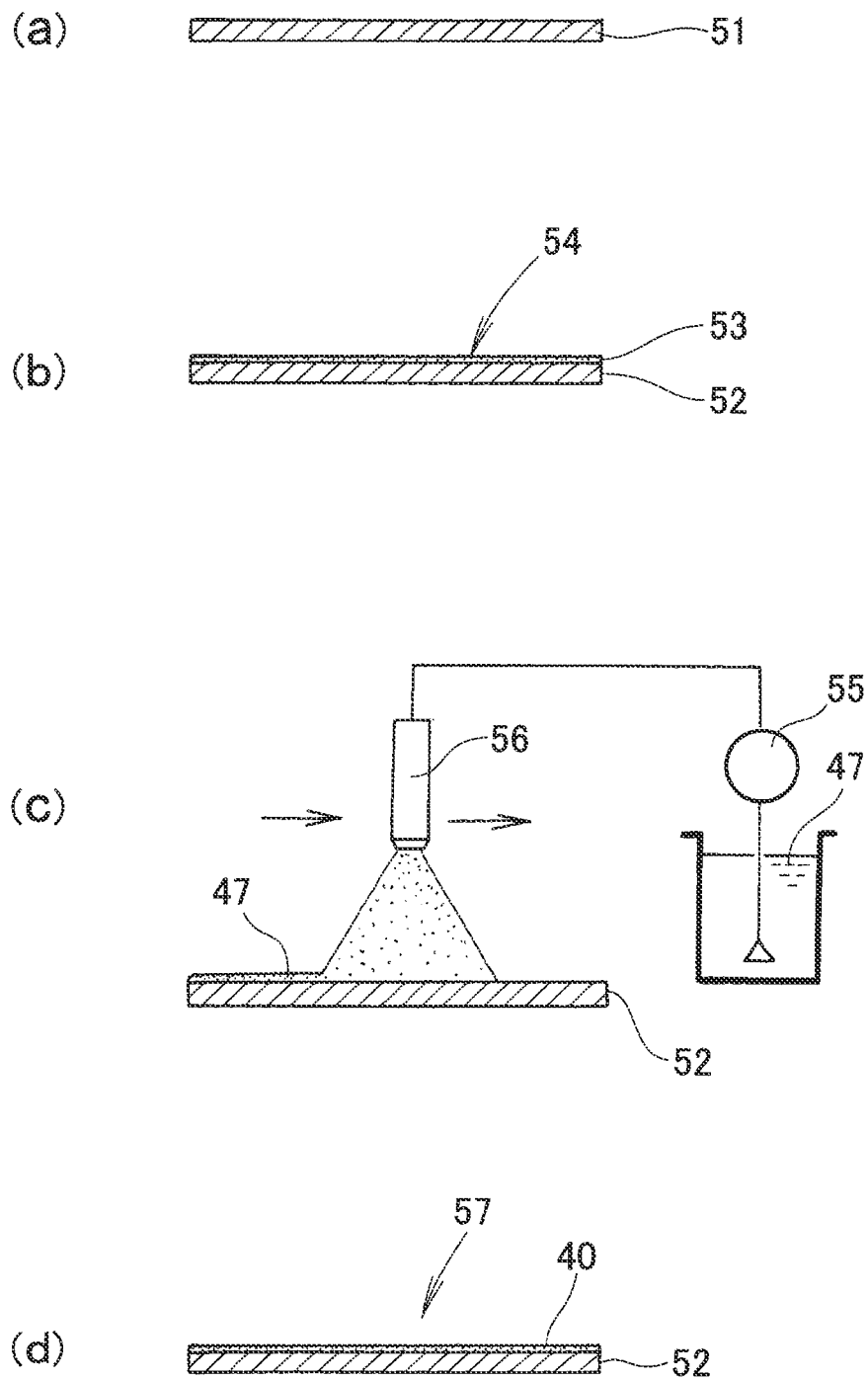
FIG. 7 is a view showing processes of manufacturing test pieces each including the slinger shown in FIG. 5.

Forms of test pieces are discussed with reference to FIG. 7.

As shown in FIG. 7(a), a test piece 51 is prepared. This test piece 51 is formed by an SUS (stainless steel) sheet which has been pretreated, i.e., washed with organic solvent for one minute. The SUS sheet has a thickness of 0.6 mm, a length of 20 mm, and a width of 60 mm.

As shown in FIG. 7(b), the pretreated SUS sheet 52 is coated with a DLC (diamond-like carbon) layer 53 to provide a test piece 54.

As shown in FIG. 7(c), a mixture 47 of a blended agent and a binder is pumped up by a pump 55 into a nozzle 56 having a diameter of 0.3 mm. The nozzle 56 is positioned 50 mm away from the pretreated SUS sheet 52 and sprays the mixture 47 under a pressure of 0.1 MPa. The spraying of the mixture 47 is done twice.

The blended agent is any of PTFE (polytetrafluoroethylene) having a particle size of 7 μm, $MoS_2$ (molybdenum disulfide) having a particle size of 2 μm, lithium stearate having a particle size of 5 μm, and urea compound particle size of 4 μm. The binder is compatible with the blended agent and is any of PAI (polyamide imide), alkyd and epoxy.

A firing process was performed at a temperature of 140° C. for 60 minutes. This resulted in a test piece 57 having the SUS sheet 52 coated with the lubricant adsorbing layer 40, as shown in FIG. 7(d). The test pieces 51, 54, 57 were subjected to a friction test below and an adsorption test discussed later.

Friction Test

Figure 8:
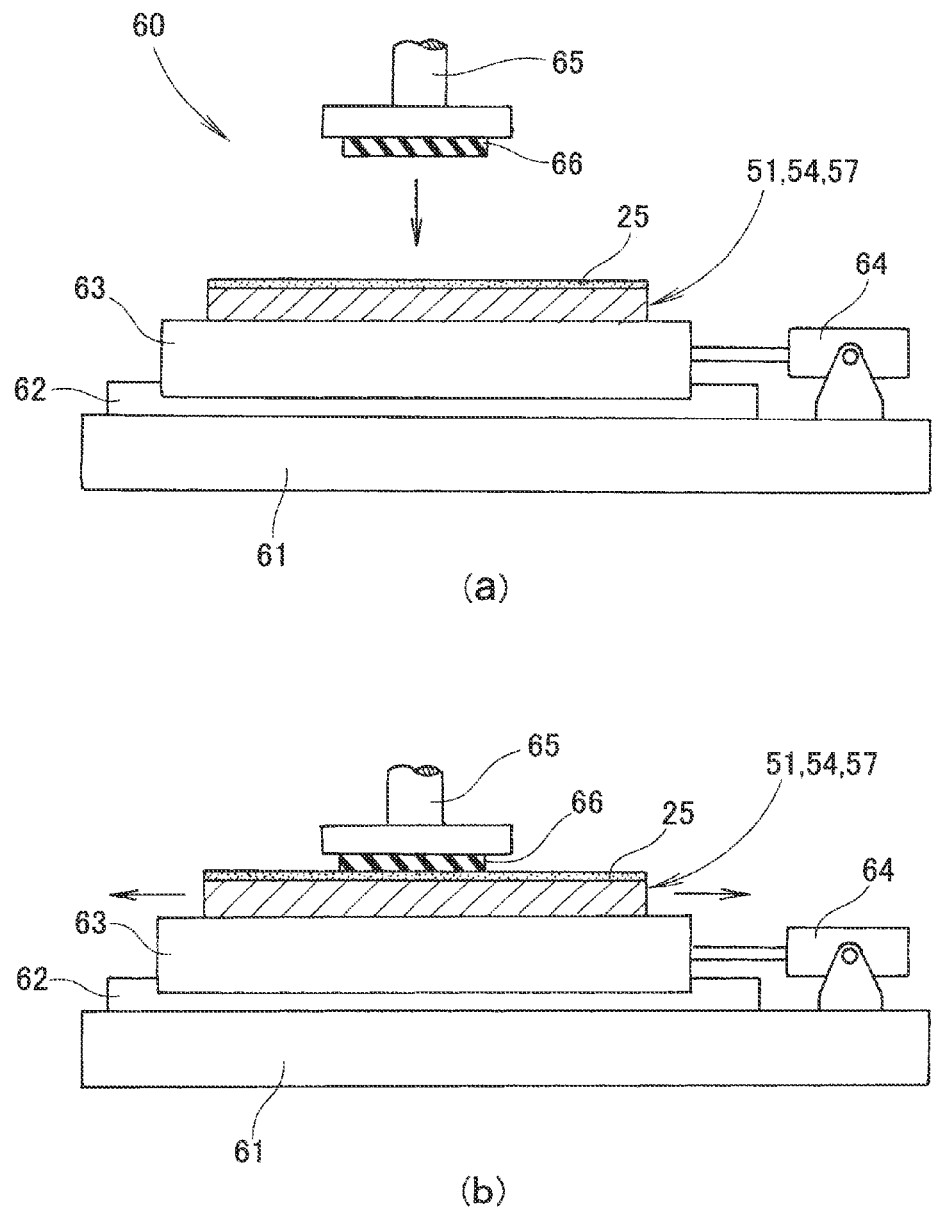
FIG. 8 is a view showing a principle of a friction testing machine for the test pieces shown in FIG. 7.

A friction test was performed on the respective test pieces according to a reciprocating pin-on-plate test known as a method for evaluating the test pieces. A principle of the reciprocating pin-on-plate test is discussed with reference to FIG. 8.

As shown in FIG. 8(a), a reciprocating pin-on-plate testing machine 60 includes a machine base 61, a rail 62 lying on the machine base 61, a slider 63 carried on the rail 62, an actuator 64 for reciprocating the slider 63, a vertically movable press pin 65 disposed above the slider 63, an NBR (acrylonitrile-butadiene rubber) sheet 66 disposed on a bottom surface of the press pin 65. The NBR sheet 66 has a thickness of 3 mm, a length of 5 mm, and a width of 20 mm.

The test piece 51, 54 or 57 is placed on the slider 63 and coated with a lubricant 25. The lubricant 25 is PYRONOC UNIVERSAL N6C (product name) (base oil viscosity of 113 $mm^2/s$) available from Nippon Oil Corporation. The press pin 65 is lowered to press the NBR sheet 66 against the lubricant 25.

As shown in FIG. 8(b), the NBR sheet 66 is pressed by the press pin 65 against the test piece 51, 54 or 57 under a pressure of 0.2 MPa. The test piece 51, 54 or 57 is reciprocated by the actuator 64 at a velocity of 50 mm/sec. A coefficient of friction is calculated from a resistance to the actuator 64.

Experiments 01 to 07

Coefficients of friction for the above-discussed test pieces were measured. Details and results of the experiments are shown in Table 1.

TABLE 1

| | | Test Piece | | | | |
|---|---|---|---|---|---|---|
| Exp. No | Form | Base Material | Blended Agent | Blended Agent Conc. (wt %) | Binder | Coefficient of Friction μ |
| Exp. 01 | FIG. 7(a) | SUS | Non-use | 0 | Non-use | 0.054 |
| Exp. 02 | FIG. 7(b) | SUS | Non-use | 0 | Non-use | 0.047 |
| Exp. 03 | FIG. 7(d) | SUS | 7 μm PTFE | 20 | PAI | 0.115 |
| Exp. 04 | FIG. 7(d) | SUS | 2 μm $MoS_2$ | 20 | PAI | 0.075 |
| Exp. 05 | FIG. 7(d) | SUS | Non-use | 0 | Alkyd | 0.047 |
| Exp. 06 | FIG. 7(d) | SUS | 5 μm Lithium Stearate | 25 | Alkyd | 0.041 |
| Exp. 07 | FIG. 7(d) | SUS | 4 μm Urea | 25 | Alkyd | 0.020 |

In experiment 01, the measured coefficient of friction of the test piece shown in FIG. 7(a) was 0.054.

In experiment 02, the coefficient of friction of the test piece shown in FIG. 7(b) was used. The coefficient of friction for this test piece was 0.047 due to the DLC film applied to the test piece, which was more preferable than that in experiment 01.

In experiment 03, measurement of a coefficient of friction was made for the test piece shown in FIG. 7(d), that is, the test piece having the mixture of 7-μm-particle-size PTFE (wt. 20%) and 80 wt. % of PAI binder sprayed on the SUS sheet.

In experiment 04, measurement of a coefficient of friction was made for the test piece replacing 7-μm-particle-size PTFE in experiment 03 with 2-μm-particle-size $MoS_2$. The measured coefficients of friction of the test pieces in experiments 03 and 04 were large.

In experiment 05, measurement of a coefficient of friction was made for the test piece having alkyd (100 wt. %) binder only sprayed on the SUS sheet. The measured coefficient of friction of the test piece was 0.047, which was slightly better than that in experiment 01.

In experiment 06, measurement of a coefficient of friction was made for the test piece having the mixture of 5-μm-particle-size lithium stearate (25 wt. %) and 75 wt. % of alkyd binder sprayed on the SUS sheet. The measured coefficient of friction of the test piece was 0.041, which was smaller than that in experiment 01.

In experiment 07, measurement of a coefficient of friction was made for the same test piece as the test piece in experiment 06 except that 5-μm-particle-size lithium stearate was replaced with a urea compound having the particle size of 4 μm. The measured coefficient of friction of the test piece was 0.020, which was smaller than that in experiment 06.

Torque Test

Figure 9:
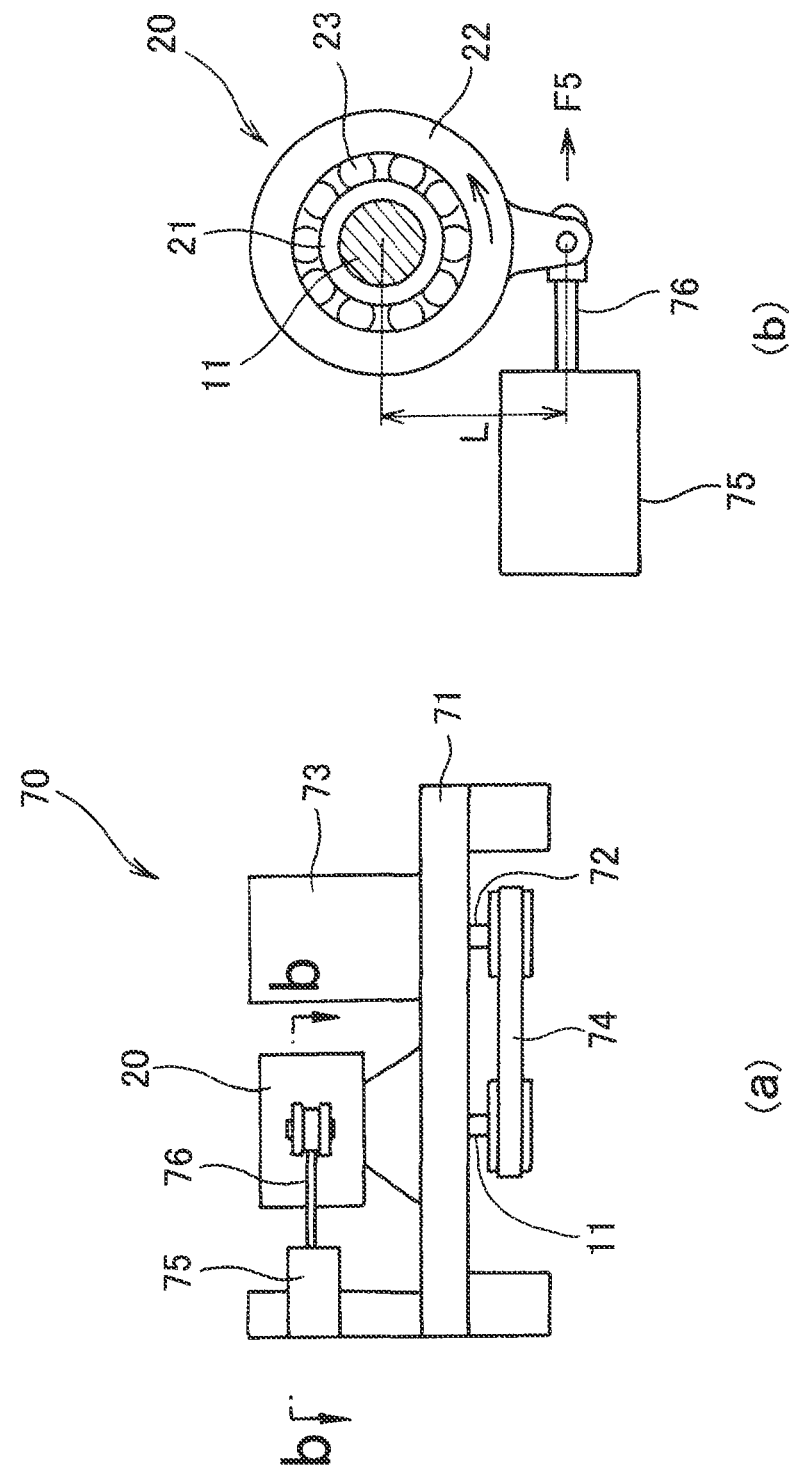
FIG. 9 is a view showing a principle of a torque testing machine.

FIG. 9 shows a principle of a torque testing machine. As shown in FIG. 9(a), a torque testing machine 70 includes a variable speed motor 73 attached to a machine base 71 with a motor shaft 72 of the motor 73 extending vertically downwardly from the machine base 71. The bearing 20 is attached to the machine base 71 with a driveshaft 11 disposed in vertical orientation. The motor shaft 72 is connected through a belt 74 to the driveshaft 11.

In addition, a load cell 75 is provided on the machine 70, as shown in FIG. 9(b), and a sensor shaft 76 of the load cell 75 is connected to the outer race 22. Although the outer race 22 is normally non-rotatable, the outer race 22 is rotatable for the purpose of experiments and the sensor shaft 76 is adapted to stop rotation of the outer race 22.

In the experiments, a torque test was done at 400 rpm equating with a rotational speed of a bearing of a vehicle traveling at a vehicle velocity of 40 km/h.

Referring to FIG. 9(b), as the driveshaft 11 and the inner race 21 rotate counterclockwise, the outer race 22 rotates therewith due to shear resistance of the lubricant or resistance of the rolling elements or the sealing device 30 (FIG. 1) contacting the inner race 21. A torque required to rotate the outer race 22 is calculated by a product F5×L where F5 stands for a force measured by the sensor shaft 76 and L stands for a distance from a rotational axis of the driveshaft 11 to the sensor shaft 76.

When the bearing 20 was subjected to the torque test, one of the two sealing devices 30 shown in FIG. 1 was removed from the bearing 20. A torque for the bearing 20 (with the one sealing device 30 attached thereto) was then measured as a first torque.

Next, a torque for the bearing 20 with the two sealing devices 30 removed therefrom was measured as a second torque. A torque for the one sealing device was calculated by subtracting the second torque from the first torque.

Experiments 01a to 07a

Torques in experiments 01a to 07a using the above-discussed bearing, blended agents and binders were measured. Details and results of the experiments are shown in Table 2.

In experiment 01a, a torque was measured using the bearing of FIG. 1 (in the two situations where: the one sealing device 30 including neither the blended agent nor the binder is attached to the bearing thereto; and no sealing device is attached to the bearing). The measured torque was 0.375 N·m. This torque value of 0.375 N·m was used as a control in evaluating torques in experiments 02a to 07a. It is noted that, in experiments 02a to 07a, torques were measured in the same manner as experiment 01a.

In experiment 02a, the slinger of the sealing device 30 attached to the bearing of FIG. 1 was coated with the DLC film. The measured torque was 0.387. This torque value was 1.03 times the torque value calculated in experiment 01a. The smaller the torque is, the more preferable it is. Thus, that value of the torque value in experiment 02a was not so good. The evaluation of the torque value in experiment 02a was "fair".

In experiment 03a, torque measurement was made using the bearing of FIG. 1 with the slinger of the sealing device sprayed with the mixture of 7-μm-particle-size PTFE (20% wt. %) and 80 wt. % of PAI binder.

In experiment 04a, torque measurement was made replacing 7-μm-particle-size PTFE in experiment 03a with 2-μm-particle-size $MoS_2$. The measured torques in experiments 03a and 04a were large, and thus evaluation of these torques were "no good".

In experiment 05a, torque measurement was made spraying the binder made of only alkyd (100 wt. %) on the slinger. The measured torque was 0.387 N·m, which value was not so good. Thus, evaluation of the torque in experiment 05a was "fair".

In experiment 06a, torque measurement was made spraying the slinger with the mixture of 5-μm-particle-size lithium stearate (25 wt. %) and a binder of 75 wt. % of alkyd. The measured torque was 0.319 N·m. This torque was 0.85 times as small as the torque in experiment 01a, which value was good. Thus, evaluation of the torque in experiment 06a was "good".

In experiment 07a, torque measurement was made in the same manner as experiment 06 except that 5-μm-particle-size lithium stearate was replaced with urea compound having the particle size of 4 μm. The measured torque was 0.205 N·m. This torque was 0.55 times as small as the torque in experiment 01a, which value was very good. Thus, evaluation of the torque in experiment 07a was "very good".

Of experiments 01a to 07a, experiment 06a using the 5-μm-particle-size lithium stearate as the blended agent and experi-

TABLE 2

| | Bearing | | | | Torque | Torque Evaluation | |
|---|---|---|---|---|---|---|---|
| Exp. No | Form | Slinger | Blended Agent | Blended Agent Conc. (wt.%) | Binder | Torque (N·m) | Ratio | Evaluation |
| Exp. 01a | FIG. 1 | SUS | Non-use | 0 | Non-use | 0.375 | 1 | Control |
| Exp. 02a | FIG. 1 | SUS | Non-use | 0 | Non-use | 0.387 | 1.03 | Fair |
| Exp. 03a | FIG. 1 | SUS | 7 μm PTFE | 20 | PAI | 0.663 | 1.77 | No Good |
| Exp. 04a | FIG. 1 | SUS | 2 μm $MoS_2$ | 20 | PAI | 0.617 | 1.65 | No Good |
| Exp. 05a | FIG. 1 | SUS | Non-use | 0 | Alkyd | 0.387 | 1.05 | Fair |
| Exp. 06a | FIG. 1 | SUS | 5 μm lithium stearate | 25 | Alkyd | 0.319 | 0.85 | Good |
| Exp. 07a | FIG. 1 | SUS | 4 μm Urea | 25 | Alkyd | 0.205 | 0.55 | Very Good | ment 07a using the 4-μm-particle-size urea compound as the blended agent show the good evaluation. It is thus recommended that lithium stearate or urea compound be used as the blended agent.

Further experiments were performed using lithium stearate or urea compound, which are discussed below.

Verification of Amount of Lithium Stearate

As discussed above, the amount or concentration of lithium stearate blended with the binder was 25 wt. % in experiments 06, 06a. To confirm whether this concentration of lithium stearate was appropriate, additional experiments 08 to 10 were performed using 10, 50 and 80 wt. % of lithium stearate, respectively.

More specifically, coefficients of friction and torques were measured in experiment 08 using 10 wt. % of lithium stearate, experiment 09 using 50 wt. % of lithium stearate, and experiment 10 using 80 wt. % of lithium stearate. The results of the measurement are shown in Table 3. It is noted that the results of experiment 06 are shown in Table 3.

TABLE 3

| | | Test Piece/Bearing | | | | |
|---|---|---|---|---|---|---|
| Exp. No | Form | Base Material/ Slinger | Blended Agent | Blended Agent Conc. (wt. %) | Binder | Coefficient of Friction μ | Torque (N·m) |
| Exp. 06 | FIG. 7 (d)/ FIG. 1 | SUS | 5 μm lithium stearate | 25 | Alkyd | 0.041 | 0.319 |
| Exp. 08 | FIG. 7 (d)/ FIG. 1 | SUS | 5 μm lithium stearate | 10 | Alkyd | 0.042 | 0.311 |
| Exp. 09 | FIG. 7 (d)/ FIG. 1 | SUS | 5 μm lithium stearate | 50 | Alkyd | 0.041 | 0.319 |
| Exp. 10 | FIG. 7 (d)/ FIG. 1 | SUS | 5 μm lithium stearate | 80 | Alkyd | 0.086 | 0.563 |

In experiment 06, the torque was 0.319 N·m. In experiment 08, the torque was 0.311 N·m. In experiment 09, the torque was 0.319 N·m. In experiment 10, the torque was 0.563 N·m.

Figure 10:
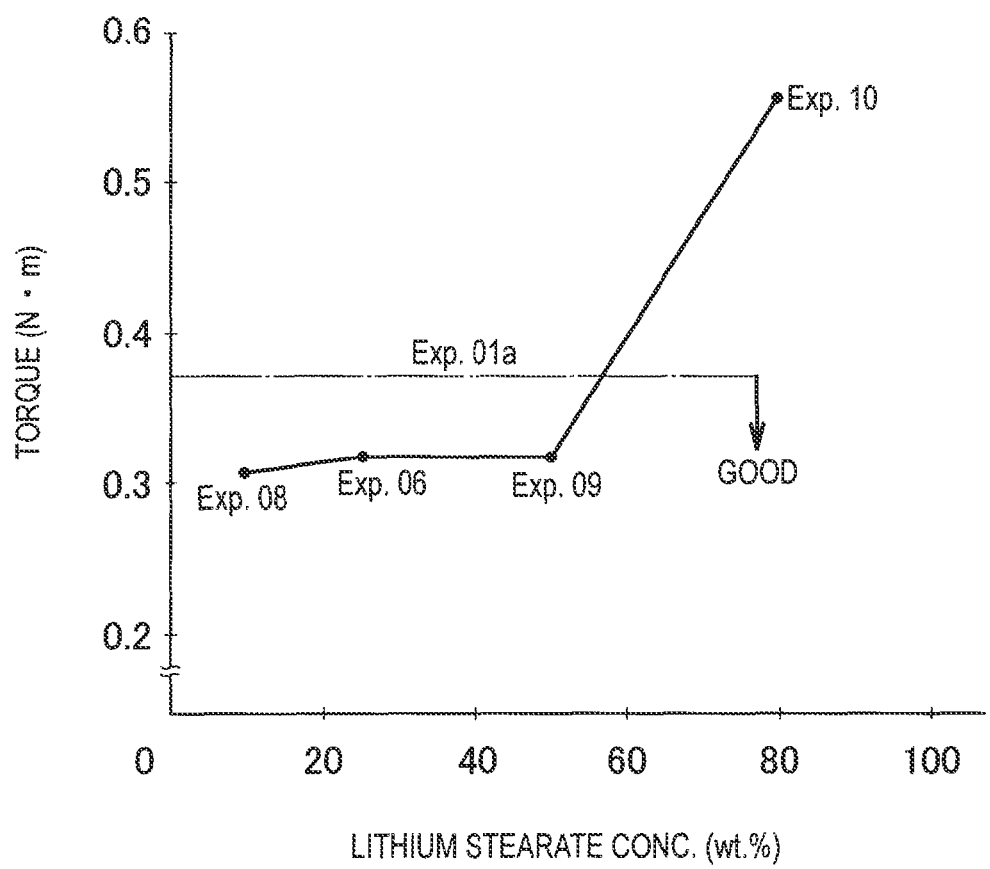
FIG. 10 is a graph showing a torque curve obtained from experiments 06, 08.

Those values of the torques are graphically shown in FIG. 10.

As discussed above, the torque was 0.375 N·m in experiment 01a, which is shown by a broken line extending in parallel to a horizontal axis of a graph of FIG. 10. Since a high torque leads to a loss of kinetic energy, the smaller a torque is, the more preferable it is. Thus, the values of the torques in experiments 06, 08, and 09 were smaller than 0.320, and thus preferable. Meantime, the value of the torque in experiment 10 was much larger than that in experiment 01a, and thus unacceptable.

From FIG. 10, it is recommended that 10 to 50 wt. % of lithium stearate be used when the blended agent is lithium stearate.

Verification of Amount of Urea Compound

In experiments 07, 07a, the amount or concentration of urea compound blended with the binder was 25 wt. %. To confirm whether this concentration of urea compound was appropriate, additional experiments 11 to 15 were performed using 5, 10, 50, 60, 80 wt. % of urea compound, respectively.

More specifically, coefficients of friction and torque were measured in experiment 11 using 5 wt. % of urea compound, experiment 12 using 10 wt. % of urea compound, experiment 13 using 50 wt. % of urea compound, experiment 14 using 60 wt. % of urea compound, and experiment 15 using 80 wt. % of urea compound. The results of experiments 11 to 15 are shown in Table 4. It is noted that the results of experiment 07 are shown in Table 4.

TABLE 4

| | | Test Piece/Bearing | | | | |
|---|---|---|---|---|---|---|
| Exp. No | Form | Base Material/ Slinger | Blended Agent | Blended Agent Conc. (wt. %) | Binder | Coefficient of Friction μ | Torque (N·m) |
| Exp. 07 | FIG. 7 (d)/ FIG. 1 | SUS | 4 μm Urea | 25 | Alkyd | 0.020 | 0.205 |
| Exp. 11 | FIG. 7 (d)/ FIG. 1 | SUS | 4 μm Urea | 5 | Alkyd | 0.017 | 0.283 |
| Exp. 12 | FIG. 7 (d)/ FIG. 1 | SUS | 4 μm Urea | 10 | Alkyd | 0.016 | 0.255 |
| Exp. 13 | FIG. 7 (d)/ FIG. 1 | SUS | 4 μm Urea | 50 | Alkyd | 0.022 | 0.283 |
| Exp. 14 | FIG. 7 (d)/ FIG. 1 | SUS | 4 μm Urea | 60 | Alkyd | 0.050 | 0.372 |
| Exp. 15 | FIG. 7 (d)/ FIG. 1 | SUS | 4 μm Urea | 80 | Alkyd | 0.085 | 0.560 |

As shown in Table 2 above, urea compound was more preferably than lithium stearate. Therefore, an adsorbing performance of the urea compound was inspected.

Adsorption Test

Figure 11:
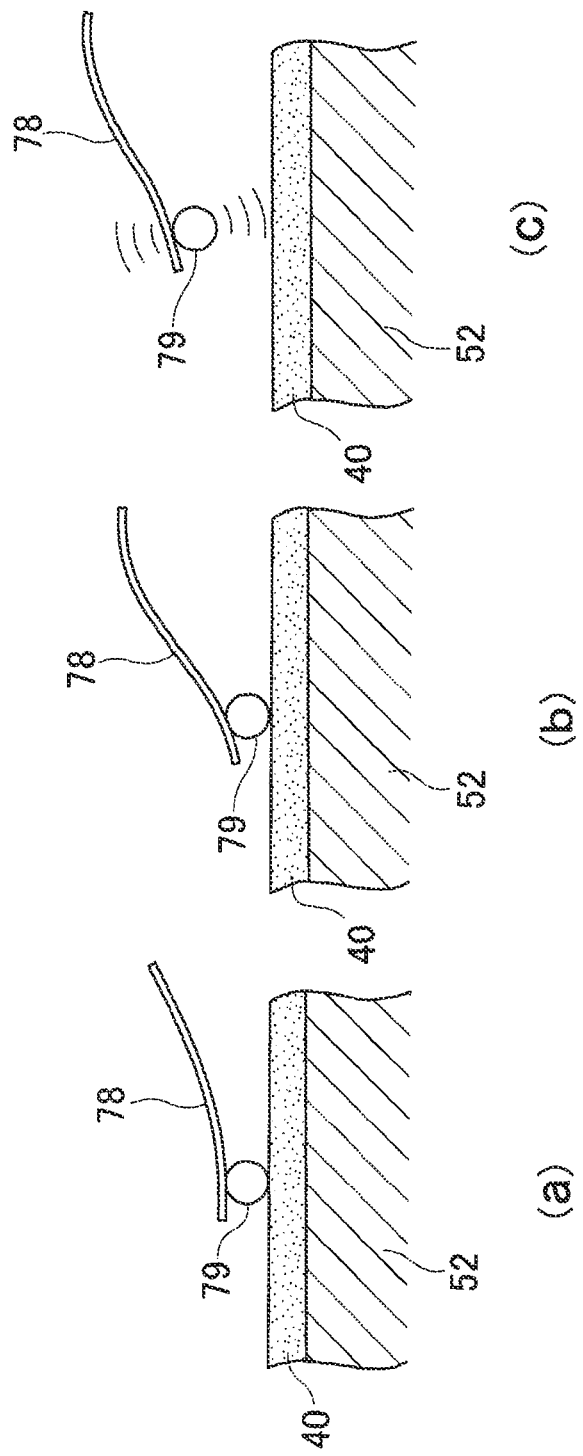
FIG. 11 is a view showing a principle of an adsorbing force test on a lubricant adsorbing layer.

An adsorption test was performed using a scanning probe microscope (SPM). The SPM is capable of inspecting a surficial shape or physical property of a micro-area of a sample by a probe. This microscope has a mode of inspecting a mechanically physical property such as friction, viscosity, adsorbing force, and phase. Using this mode, an adsorbing force of a lubricant adsorbing layer was inspected. A principle for measuring the adsorbing force is discussed below with reference to FIG. 11.

As shown in FIG. 11(a), the probe includes a cantilever 78 and a sphere 79 provided on a lower surface of a distal end of the cantilever 78. The sphere 79 is made of a 20-μm-diameter silica bead chemically modified with amino group. A lubricant adsorbing layer 40 is applied to an upper surface of an SUS sheet 52 disposed below and in contact with the sphere 79.

As shown in FIG. 11(b), the SUS sheet is fixed and the cantilever 78 is pulled up, whereupon the sphere 79 is pulled down flexing the cantilever 78. At this time, a reaction force of the flexed cantilever 78 increases.

When the cantilever 78 is further pulled up, the reaction force of the cantilever 78 overcomes an adsorbing force of the lubricant adsorbing layer 40, thereby moving the sphere 79 out of adsorption on the lubricant adsorbing layer 40. The adsorbing force of the lubricant adsorbing layer 40 is obtained from an amount by which the cantilever 78 is flexed until the sphere 79 is moved out of adsorption on the lubricant adsorbing layer 40. The results of the adsorption test are shown in Table 5.

TABLE 5

| Exp. No | Form | Test Piece Base Material | Blended Agent | Blended Agent Conc. (wt. %) | Binder | Adsorbing Force (μN) | Torque (N·m) |
|---|---|---|---|---|---|---|---|
| Exp. 16 | The same form as Exp. 01 | SUS | Non-use | 0 | Non-use | 0.082 | 0.375 |
| Exp. 17 | The same form as Exp. 05 | SUS | Non-use | 0 | Alkyd | 0.046 | 0.387 |
| Exp. 18 | The same form as Exp. 11 | SUS | 4 μm Urea | 5 | Alkyd | 0.088 | 0.283 |
| Exp. 19 | The same form as Exp. 12 | SUS | 4 μm Urea | 10 | Alkyd | 0.095 | 0.255 |
| Exp. 20 | The same form as Exp. 07 | SUS | 4 μm Urea | 25 | Alkyd | 0.110 | 0.205 |
| Exp. 21 | The same form as Exp. 13 | SUS | 4 μm Urea | 50 | Alkyd | 0.110 | 0.283 |
| Exp. 22 | The same form as Exp. 14 | SUS | 4 μm Urea | 60 | Alkyd | 0.110 | 0.372 |
| Exp. 23 | The same form as Exp. 15 | SUS | 4 μm Urea | 80 | Alkyd | 0.110 | 0.560 |

In experiment 16, the adsorbing force was obtained for the same test piece as that in experiment 01 (without a blended agent and a binder).

In experiment 17, the adsorbing force was obtained for the same test piece as that in experiment 05 (using a blended agent and a binder). It is believed that the binder does not have an adsorbing function but a releasing function.

In experiments 18 to 23, the adsorbing forces were obtained for the test pieces varying a urea compound-to-alkyd ratio, i.e., concentration of urea compound, as in experiments 11 to 15. It is noted that the torque values shown in Tables 2 and 4 are shown in the rightmost column of Table 5. The adsorbing forces and torques are graphically shown.

Figure 12:
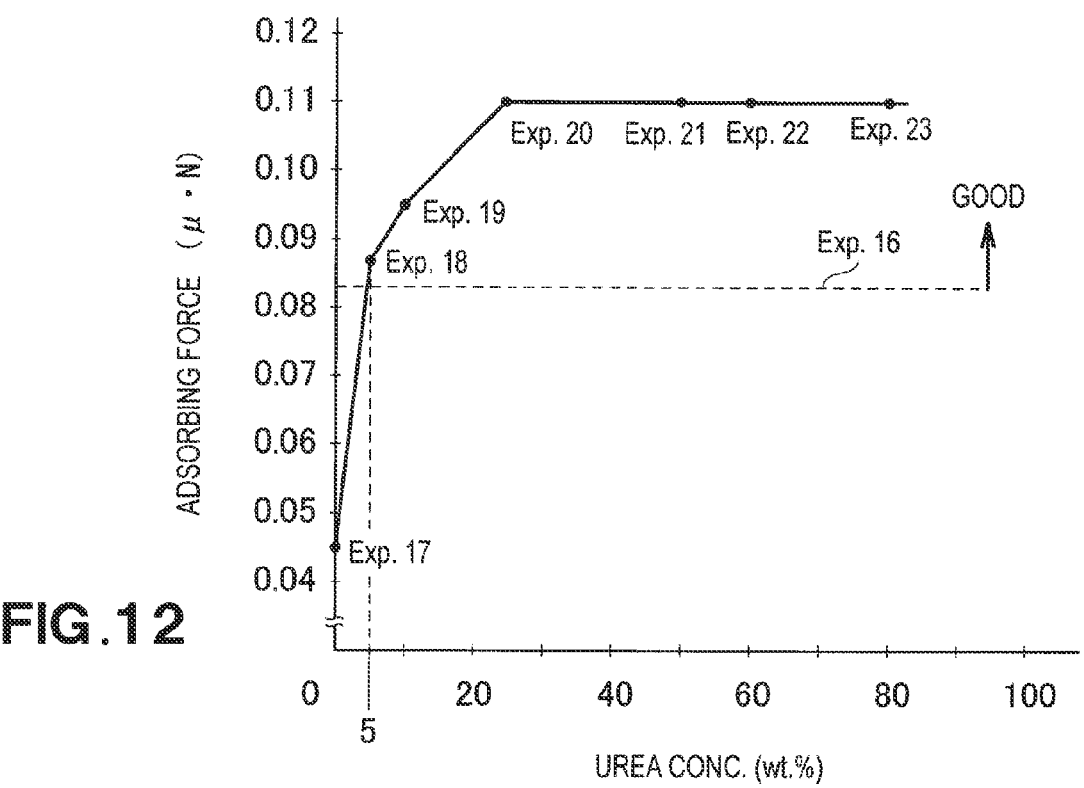
FIG. 12 is a view showing an adsorbing force curve obtained from experiments 17 to 23.

As shown in FIG. 12, the adsorbing force increases as the concentration of urea compound increases. A broken line extending in parallel to a horizontal axis shows the adsorbing force in experiment 16. Experiment 16 was performed without using a blended agent and a binder. A large adsorbing force is preferable because the larger the adsorbing force, the more a lubricant is retained. The adsorbing force in experiment 17, which was smaller than that in experiment 16, was unacceptable. The adsorbing forces in the other experiments were larger than that in experiment 16. In terms of the adsorbing force, 5 wt. % or more of urea compound is preferable.

Figure 13:
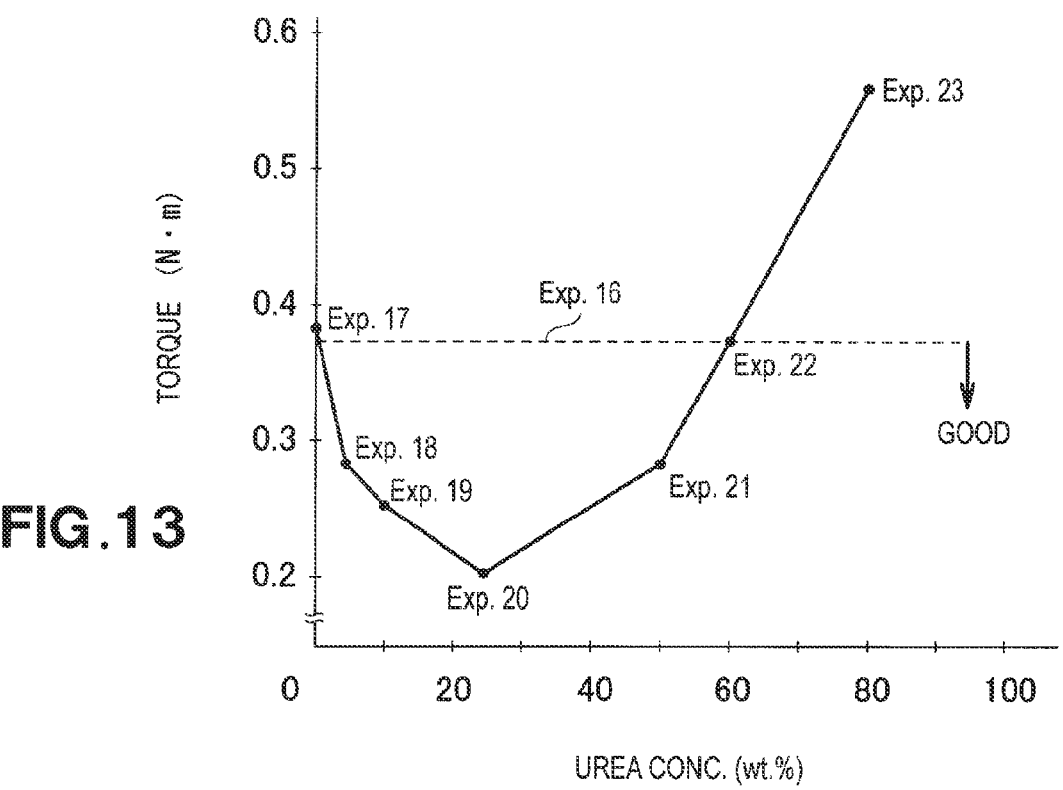
FIG. 13 is a view showing a torque curve obtained from experiments 17 to 23.

Turning to FIG. 13, the torque varies depending very much on the concentration of urea compound. The smaller the torque is, the more preferable it is. In terms of the torque, 60 wt. % or less of urea compound is preferable. In terms of both the adsorbing force and the torque, 5 to 60 wt. % of urea compound is preferable.

Figure 14:
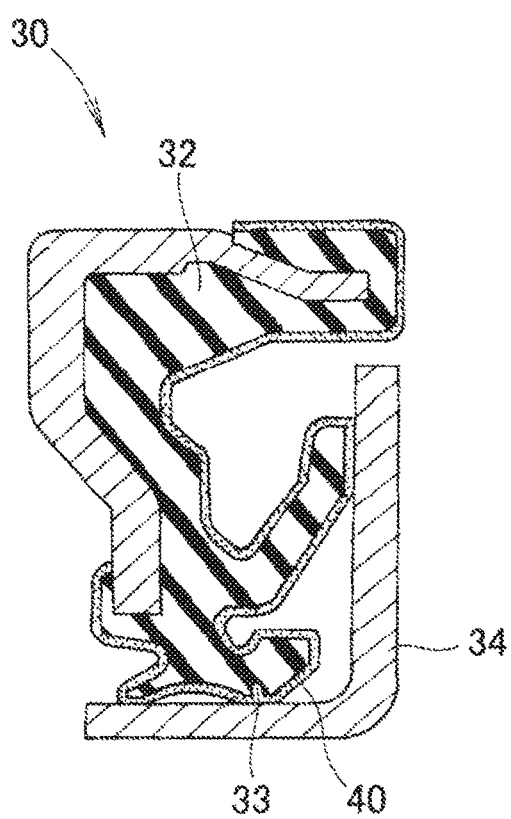
FIG. 14 is a cross-sectional view of a sealing device for a bearing, with a lubricant adsorbing layer applied to a seal member.

In the above experiments, the lubricant adsorbing layer 40 was applied to the slinger. The lubricant adsorbing layer 40 may be provided on a seal member. That is, as shown in FIG. 14, in a sealing device 30 for a bearing including a core metal 31, a seal member 32 and a slinger 34, the lubricant adsorbing layer 40 is applied to the seal member 32. To inspect coefficients of friction and torques where the lubricant adsorbing layer 40 is arranged in the manner shown in FIG. 14, experiments 24 to 31 were performed.

In experiments 24 to 27, coefficients of friction and torques were measured using an NBR-formed seal member to which was applied a lubricant adsorbing layer composed of lithium stearate and epoxy. The results of the measurement are shown in Table 6 and a relationship between the torque and concentration of lithium stearate is shown in FIG. 15.

TABLE 6

| Exp. No | Form | Test Piece/Bearing Base Material/ Seal Member | Blended Agent | Blended Agent Conc. (wt. %) | Binder | Coefficient of Friction μ | Torque (N·m) |
|---|---|---|---|---|---|---|---|
| Exp. 24 | FIG. 7 (d)/ FIG. 14 | NBR | 5 μm lithium stearate | 10 | Epoxy | 0.046 | 0.338 |
| Exp. 25 | FIG. 7 (d)/ FIG. 14 | NBR | 5 μm lithium stearate | 25 | Epoxy | 0.044 | 0.323 |
| Exp. 26 | FIG. 7 (d)/ FIG. 14 | NBR | 5 μm lithium stearate | 50 | Epoxy | 0.043 | 0.315 |
| Exp. 27 | FIG. 7 (d)/ FIG. 14 | NBR | 5 μm lithium stearate | 80 | Epoxy | 0.089 | 0.581 |

Figure 15:
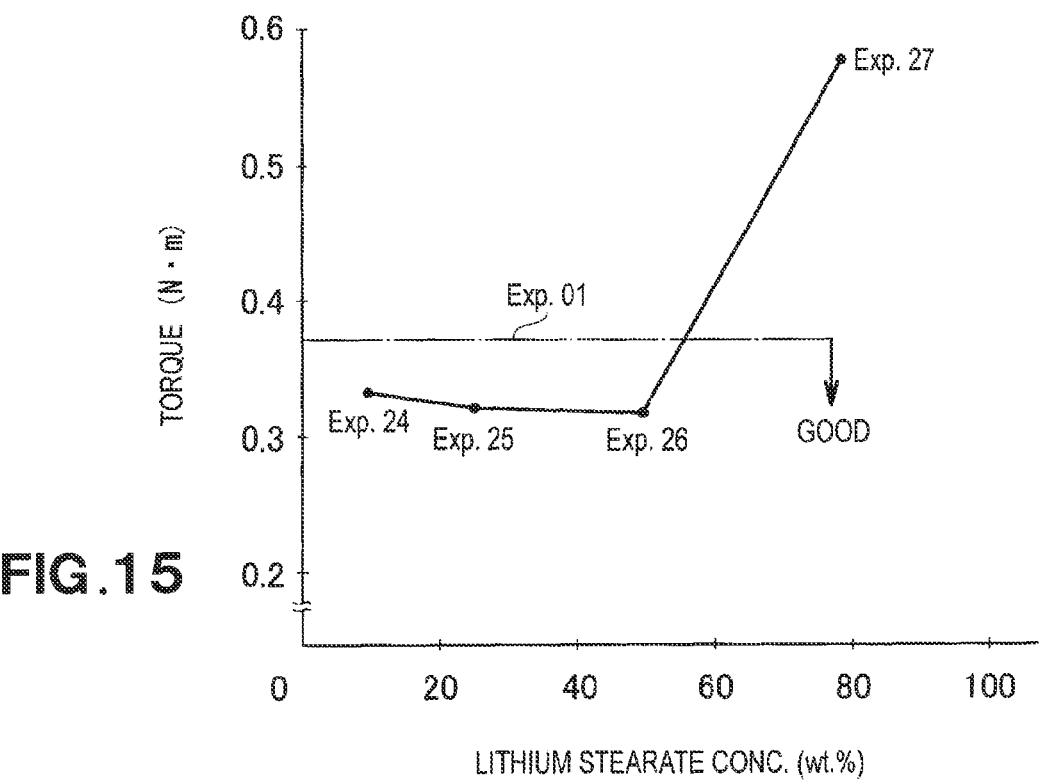
FIG. 15 is a view showing a torque curve obtained from experiments 24 to 27.

The graph in FIG. 15 is very similar to that in FIG. 10. FIG. 15 and FIG. 10 show that the same advantageous results were provided regardless of whether the lubricant adsorbing layer was applied to the sliding contact surface of the slinger or to the lip portion of the seal member.

In experiments 28 to 31, coefficients of friction and torques were measured using an NBR-formed seal member to which was applied a lubricant adsorbing layer composed of urea compound and epoxy. The results of the measurement are shown in Table 7 and a relationship between the torque and concentration of lithium stearate is shown in FIG. 16.

TABLE 7

| Exp. No | Form | Test Piece/Bearing Base Material/ Seal Member | Blended Agent | Blended Agent Conc. (wt. %) | Binder | Coefficient of Friction μ | Torque (N·m) |
|---|---|---|---|---|---|---|---|
| Exp. 28 | FIG. 7 (d)/ FIG. 14 | NBR | 4 μm Urea | 10 | Epoxy | 0.026 | 0.264 |
| Exp. 29 | FIG. 7 (d)/ FIG. 14 | NBR | 4 μm Urea | 25 | Epoxy | 0.024 | 0.224 |
| Exp. 30 | FIG. 7 (d)/ FIG. 14 | NBR | 4 μm Urea | 50 | Epoxy | 0.029 | 0.273 |
| Exp. 31 | FIG. 7 (d)/ FIG. 14 | NBR | 4 μm Urea | 80 | Epoxy | 0.086 | 0.563 |

Figure 16:
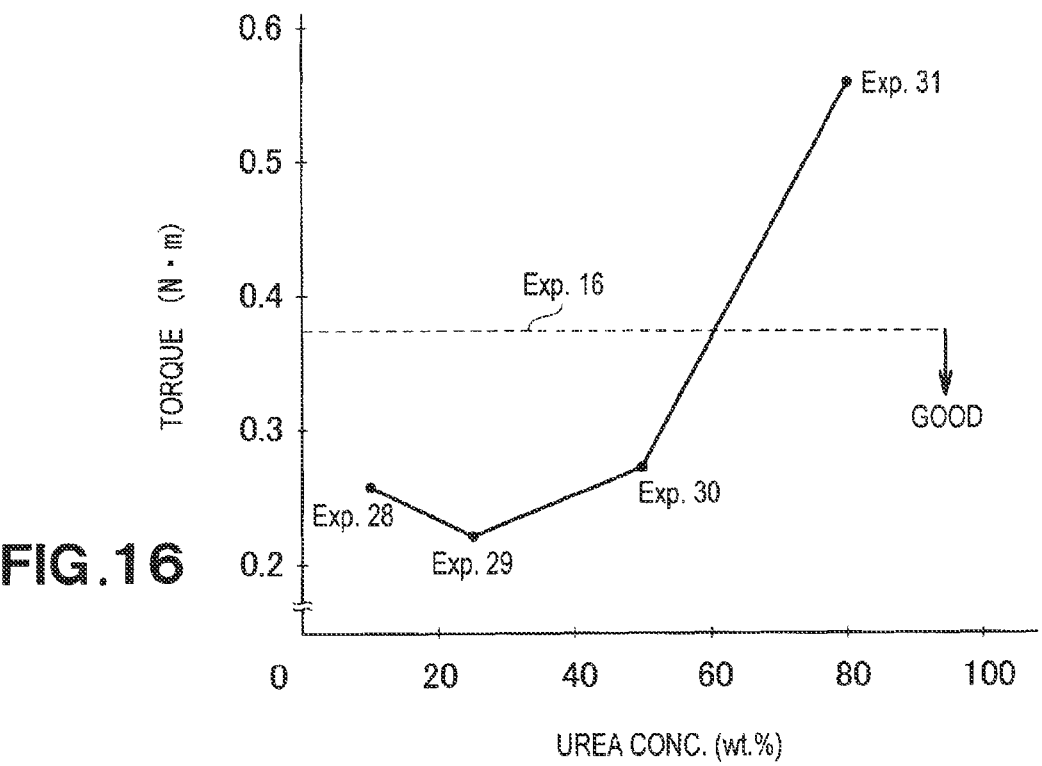
FIG. 16 is a view showing a torque curve obtained from experiments 28 to 31.

The graph in FIG. 16 is very similar to that in FIG. 13. FIG. 16 and FIG. 13 show that the same advantageous results were provided regardless of whether the lubricant adsorbing layer was applied to the sliding contact surface of the slinger or to the lip portion of the seal member.

Experiments 01 to 31 discussed above show that lithium stearate or urea compound can be used as a thickener for grease while alkyd or epoxy can be used as a binder.

The present inventors performed additional experiments. As a result, they have found that melamine-based condensate can be used as a thickener for grease while phenol can be used as a binder. Details and results of these additional experiments are discussed below.

Experiments 32 to 37

A binder of phenol and a thickener of melamine-based condensate for grease were mixed together. Test pieces were prepared varying melamine-based condensate in the range of 12.5 to 72.6 wt. %. Adsorbing forces and torques were measured for the prepared test pieces. The results of the measurement are shown in Table 8. It is noted that the measurement was made in the manner discussed hereinabove.

TABLE 8

| | Test Piece | | | | | | |
|---|---|---|---|---|---|---|---|
| Exp. No | Form | Base Material | Blended Agent | Blended Agent Conc. (wt. %) | Binder | Adsorbing Force (μN) | Torque (N·m) |
| Exp. 32 | FIG. 7(d) | SUS | melamine-based condensate | 12.5 | Phenol | 0.18 | 0.263 |
| Exp. 33 | FIG. 7(d) | SUS | melamine-based condensate | 23.7 | Phenol | 0.27 | 0.244 |
| Exp. 34 | FIG. 7(d) | SUS | melamine-based condensate | 30.6 | Phenol | 0.29 | 0.259 |
| Exp. 35 | FIG. 7(d) | SUS | melamine-based condensate | 43.1 | Phenol | 0.28 | 0.281 |
| Exp. 36 | FIG. 7(d) | SUS | melamine-based condensate | 63.8 | Phenol | 0.24 | 0.300 |
| Exp. 37 | FIG. 7(d) | SUS | melamine-based condensate | 72.6 | Phenol | 0.14 | 0.311 |

Figure 17:
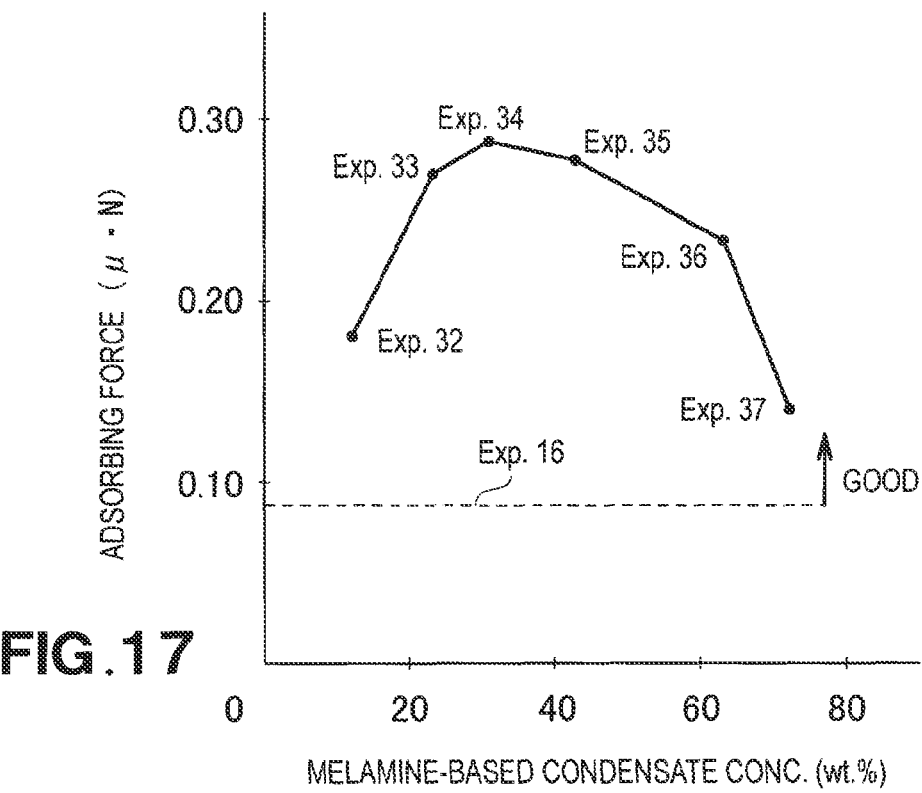
FIG. 17 is a view showing an adsorbing force curve obtained from experiments 32 to 37.

The adsorbing forces in experiments 32 to 37 are graphically shown in FIG. 17. The torques in experiments 32 to 37 are graphically shown in FIG. 18. As shown in FIG. 17, the graph of the adsorbing forces takes the form of an upward convex curve. The larger the large adsorbing force is, the more preferable it is because the adsorbing force is connected to retainability of a lubricant. The adsorbing forces obtained in experiments 32 to 37 are all larger than the adsorbing force of 0.082 μN in experiment 16. Further, the adsorbing forces shown in FIG. 17 are much larger than those shown in FIG. 12. This means that melamine-based condensate provides a larger adsorbing force than lithium stearate and urea compound.

Figure 18:
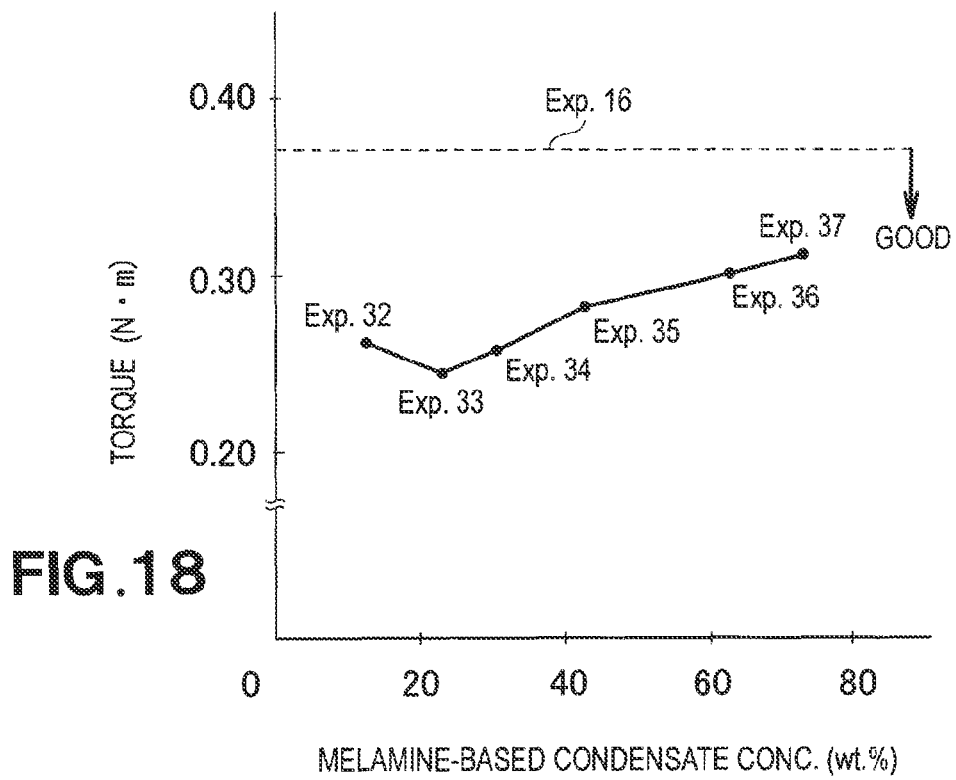
FIG. 18 is a view showing a torque curve obtained from experiments 32 to 37.

As shown in FIG. 18, the graph of the torques takes the form of a downward convex curve. The smaller the torque is, the more preferable it is because the torque is connected to an energy loss. The torques obtained in experiments 32 to 37 are all lower than the torque of 0.375 N·m in experiment 16.

Experiments 38 to 40

A binder of phenol and a thickener of melamine-based condensate for grease were mixed together into a lubricant adsorbing layer. This lubricant adsorbing layer was arranged in the manner shown in FIG. 14. Torque measurement was then made. The results of the measurement are shown in Table 9.

TABLE 9

| | Test Piece/Bearing | | | | | |
|---|---|---|---|---|---|---|
| Exp. No | Form | Base Material/ Seal Member | Blended Agent | Blended Agent Conc. (wt. %) | Binder | Torque (N·m) |
| Exp. 38 | FIG. 7(d)/FIG. 14 | NBR | melamine-based condensate | 12.5 | Phenol | 0.270 |
| Exp. 39 | FIG. 7(d)/FIG. 14 | NBR | melamine-based condensate | 30.6 | Phenol | 0.259 |
| Exp. 40 | FIG. 7(d)/FIG. 14 | NBR | melamine-based condensate | 63.8 | Phenol | 0.300 |

Figure 19:
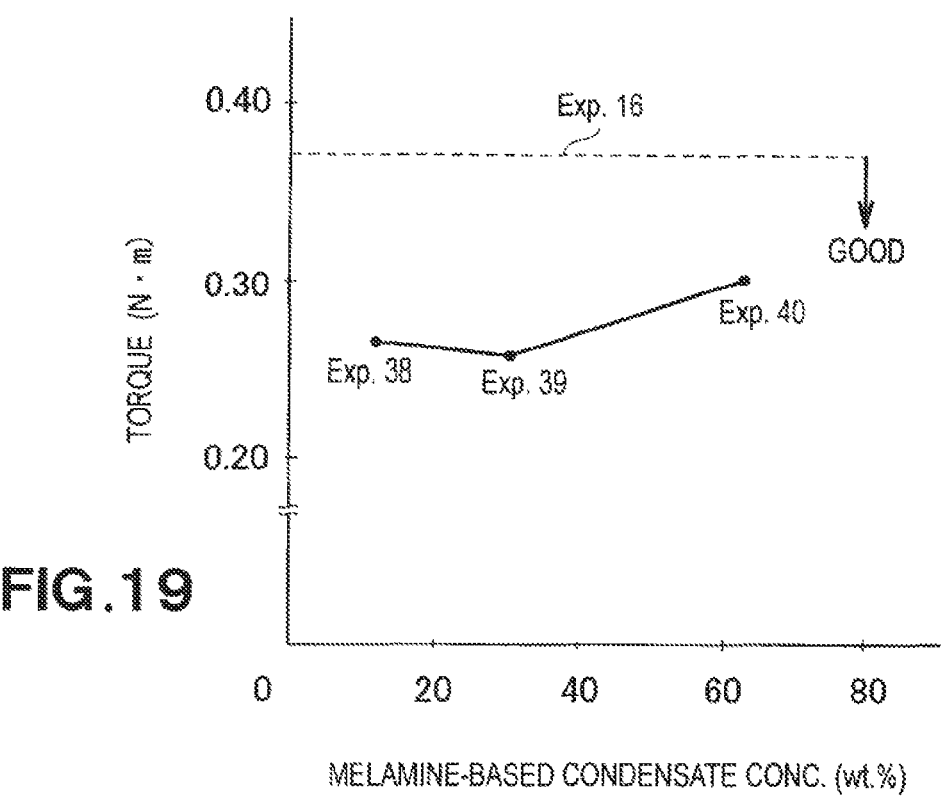
FIG. 19 is a view showing a torque curve obtained from experiments 38 to 40.
Figure 20:
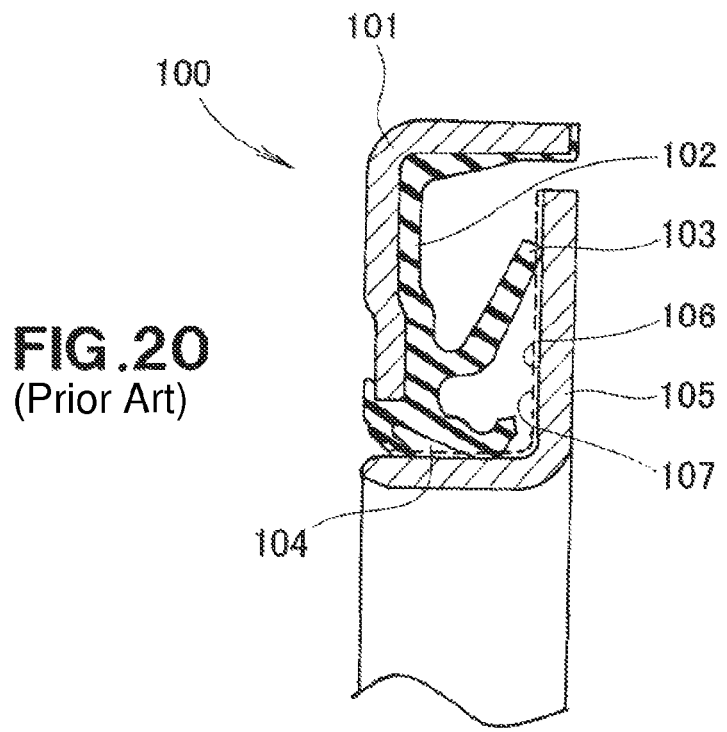
FIG. 20 is a cross-sectional view of a well-known sealing device.

The obtained torques are graphically shown in FIG. 19. As shown in FIG. 19, the graph of the torques takes the form of a downward convex curve. The smaller the torque is, the more preferable it is because the torque is connected to an energy loss. The torques obtained in experiments 38 to 40 are all smaller than the torque of 0.375 N·m in experiment 16.

Experiments 38 to 40 reveal that melamine-based condensate can be used as a thickener for grease and phenol can be used as a binder.

Although a sealing structure for a bearing has been discussed as being used in a vehicle, it may be used in a general-purpose machine other than the vehicle.

INDUSTRIAL APPLICABILITY

The sealing structure for the bearing according to the present invention is suitable for use in a vehicle.

REFERENCE SIGNS LIST

20 . . . a bearing, 21 . . . an inner race, 22 . . . an outer race, 23 . . . rolling elements, 25 . . . a lubricant, 30 . . . a sealing device for a bearing, 31 . . . a core metal, 32 . . . a seal member, 33 . . . a lip portion, 34 . . . a slinger, 39 . . . a sliding contact surface, 40 . . . a lubricant adsorbing layer, 41 . . . a thickener, 42 . . . a binder

The invention claimed is:
1. A sealing device for a bearing having an inner race, an outer race, rolling elements fitting between the inner race and the outer race, and a lubricant filling a space around the rolling elements, the device being disposed between the inner race and the outer race to prevent leakage of the lubricant, the device comprising:

a seal member reinforced by a core metal; and an L-shaped cross-sectional slinger having a sliding contact surface formed in sliding contact with a lip portion of the seal member, wherein at least one of the sliding contact surface of the slinger and the lip portion has a lubricant adsorbing layer formed thereon for adsorbing the lubricant, the lubricant adsorbing layer being made of a thickener for grease and a binder.

2. The device of claim 1, wherein the lubricant adsorbing layer is formed by a spraying or dipping process.

3. The device of claim 1, wherein the thickener is lithium stearate or urea compound, and the binder is one of alkyd and epoxy.

4. The device of claim 3, wherein the lubricant adsorbing layer is formed by a spraying or dipping process.

5. The device of claim 1, wherein the thickener is melamine-based condensate and the binder is phenol.

6. The device of claim 5, wherein the lubricant adsorbing layer is formed by a spraying or dipping process.

\* \* \* \* \*